United States Patent [19]

Kapers, Jr.

[11] 3,758,825

[45] Sept. 11, 1973

[54] DIGITAL DEFLECTION SYSTEM FOR CATHODE RAY TUBES

[75] Inventor: William John Kapers, Jr., Randolph Township, Morris County, N.J.

[73] Assignee: Bell Telephone Laboratories, Incorporated, Murray Hill, N.J.

[22] Filed: Aug. 20, 1971

[21] Appl. No.: 173,364

[52] U.S. Cl. ............................... 315/276 D, 315/18

[51] Int. Cl. ............................................ H01j 29/70

[58] Field of Search .................. 315/27 GD, 27 TD, 315/27 R, 18, 19, 22; 340/324 A; 235/198

[56] References Cited

UNITED STATES PATENTS

| | | | |
|---|---|---|---|
| 3,493,732 | 2/1970 | Zeheb | 340/324 A |
| 3,435,278 | 3/1970 | Carlock et al. | 315/27 GD |
| 3,364,479 | 1/1968 | Henderson et al. | 315/22 |
| 3,648,097 | 3/1972 | Merryman | 315/24 |

*Primary Examiner*—Carl D. Quarforth
*Assistant Examiner*—J. M. Potenza
*Attorney*—W. L. Keefauver

[57] ABSTRACT

A linearly changing current applied to a deflection coil of a relatively flatfaced cathode ray tube results in a nonlinear sweep on the tube face. The disclosed circuit, which comprises a clock source, a pair of counters, word recognizing circuitry, and a digitally controlled current source, reduces this nonlinearity by producing a sweep current having a nonuniform staircase waveshape.

4 Claims, 4 Drawing Figures

DIGITAL DEFLECTION SYSTEM FOR CATHODE RAY TUBES

GOVERNMENT CONTRACT

The invention herein claimed was made in the course of or under a contract with the Department of the Navy.

BACKGROUND OF THE INVENTION

1. Field of the Invention

This invention relates to linearizing the horizontal and/or vertical beam displacements as they appear on the face of a cathode ray tube.

2. Description of the Prior Art

Alphanumeric or other data is often displayed on cathode ray tubes which displays in turn may be photographed to produce "hard" copies. As such displays frequently must have little distortion, the tendency has been to use flatter-faced tubes. This, however, has increased distortion of another nature when the tube beam is magnetically deflected. In particular, when a beam is magnetically deflected about a point which is displaced from a tube face by a distance less than the radius of curvature of the face, the sweep produced on the face is not linear with respect to the current producing the deflection. This distortion is, of course, aggravated when using relatively flat-faced tubes because the radius of curvature approaches infinity.

In order to reduce the above-described distortion, various compensating arrangements have been proposed. Although the compensations produced by these prior art arrangements are adequate for many applications, they are inadequate for others.

SUMMARY OF THE INVENTION

An object of the invention is to improve the linearity of displays produced by cathode ray tubes.

Another object is to provide improved compensation for distortions produced when a cathode ray tube beam is magnetically deflected about a point other than the center of curvature of the tube face.

These and other objects are achieved by generating a staircase type of sweep current which is nonlinear with respect to time. In particular, all changes in the current amplitude are of the same magnitude but the intervals between changes are controlled in a nonuniform manner to achieve the desired compensation. This is accomplished, in accordance with the invention, by controllably gating the output of a clock source as applied to a counter whose output, in turn, controls a digitally responsive current source. Controllable gating is attained by feeding the clock source output to a second counter whose outputs are applied to word recognizing circuitry. Upon the occurrence of predetermined outputs from the second counter, the word recognizing circuitry produces outputs which disable a gate connected between the clock source and the first-mentioned counter.

DESCRIPTION OF THE DISCLOSED EMBODIMENT

Figure 1:
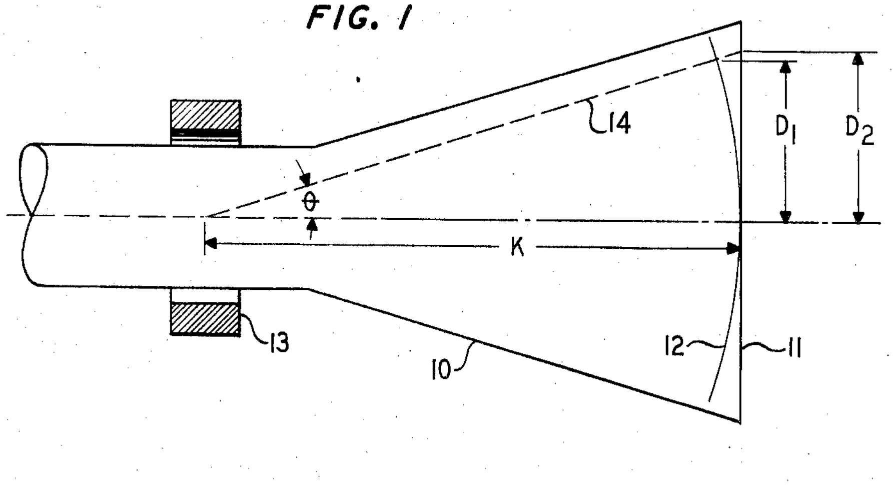
FIG. 1 is a diagram of a cathode ray tube and a deflection coil for use in understanding the nonlinearity problem.

The sketch shown in FIG. 1 includes a cathode ray tube 10 which for purposes of discussion is shown as having both a flat face 11 and a curved face 12 having a radius equal to K. A magnetic deflection coil 13 is placed around the neck of the tube 10 at distance K from the common center of the tube faces. Coil 13 is shown as deflecting an electron beam 14 by an angle $\theta$ with respect to the axis of tube 10. Beam 14 intercepts faces 11 and 12 at points displaced perpendicularly from the tube axis by distances D1 and D2, respectively. The sine of angle $\theta$ is proportional to the magnetic field of coil 13, which is proportional to the coil current. Distance D1 is therefore proportional to the coil current. Distance D2, however, is equal to the tangent of angle $\theta$ and therefore is not proportional to the coil current. In fact, the ratio of distance D2 to coil current increases with coil current. A uniformly changing coil current therefore produces a uniform sweep on face 12 and a nonuniform sweep on face 11. This nonuniform sweep results in distortions on face 11.

Figure 2:
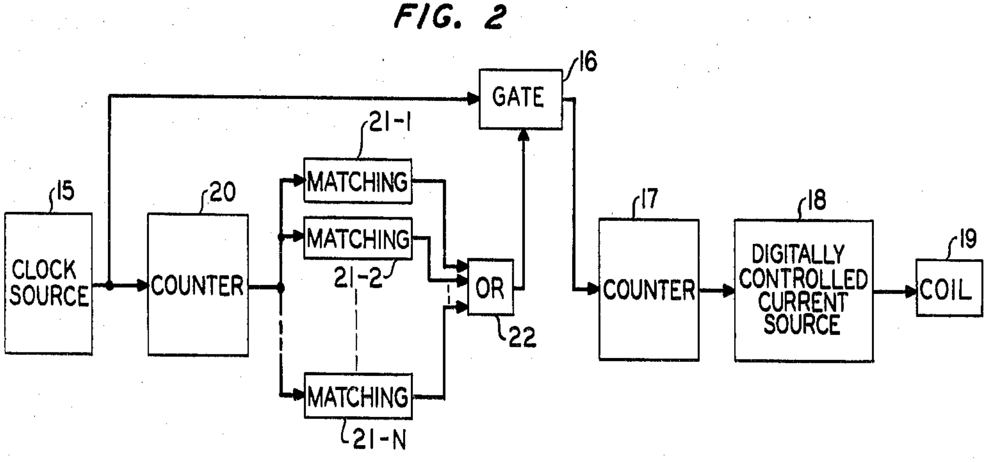
FIG. 2 is a block diagram of an embodiment of the invention.

The embodiment of the invention depicted by FIG. 2 substantially linearizes, as a function of time, the sweep on face 11. The embodiment includes a clock source 15 which produces uniformly spaced pulses. These pulses are applied to a normally enabled gate 16 which is controllably disabled by apparatus to be subsequently described. When enabled, gate 16 passes pulses to a counter 17 whose output increases by one in response to each input pulse and, furthermore, recycles after reaching its maximum count. Gate 16 may in practice form an integral part of counter 17, in which case the output of OR gate 22 is applied to an inhibit input terminal associated with counter 17. The output from counter 17 drives a digitally controlled current source 18. For symmetrical deflection, source 18 produces an output current which changes from a maximum value of one polarity to a similar maximum value of the opposite polarity in direct relation to the output of counter 17. The output from source 18 is therefore zero when counter 17 produces its midrange output. (Use of the invention is not limited to full scale deflection but may be used, for example, for a skewed deflection.) The output from source 18 is applied to a coil 19.

Gate 16 is controllably disabled by a counter 20 and word recognizing circuitry comprising a plurality of matching gates 21–l through 21–N and an OR gate 22. Counter 20 receives the output from clock source 15 and produces an output which increases uniformly for the duration of the desired sweep and then recycles. Matching gates 21–l through 21–N are connected to the output leads of counter 20 so that each gate recognizes a particular output from counter 20 and produces an output in response thereto. (The number of these gates and the manner in which they are organized to response is described subsequently.) The outputs from gates 21–l to 21–N are applied to OR gate 22 which applies a disabling input to gate 16 whenever one of matching gates 21–l through 21–N produces an output. In practice, OR gate 22 may comprise the disabling input terminal of gate 16 or, when counter 17 has an inhibiting input terminal (thereby making gate 16 unnecessary), an inhibiting input terminal on counter 17.

Figure 3:
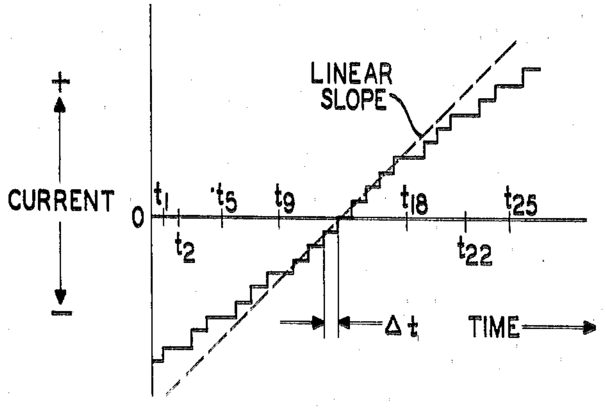
FIG. 3 is a simplified example of a sweep current produced by embodiments of the invention.

The embodiment of FIG. 2 produces a staircase type of sweep current in which all changes in current are of the same magnitude while the intervals between changes are controlled in accordance with a pattern to achieve the desired compensation. A simplified example of such a staircase type of sweep current is shown in FIG. 3. In this example, it will be noted that the centermost portion of the sweep current changes amplitudes at time intervals $\Delta t$. Changes have not occurred, however, at times $t_2$, $t_5$, $t_9$, $t_{18}$, $t_{22}$, and $t_{25}$. This is accomplished by the embodiment of FIG. 2 by using six matching gates for matching gates 21–l through 21–N and connecting these gates to counter 20 so that they produce outputs in response to counts occurring at times $t_2$, $t_5$, $t_9$, $t_{18}$, $t_{22}$ and $t_{25}$, respectively.

In the embodiments of the invention one must of course select the repetition rate for clock source 15, the limits for counters 17 and 20, the limits for current source 18, and the number of matching gates 21–l through 21–N and their connections to counter 20. Such selections may be performed in the following manner. The cathode ray tube and the coil determine the current limits for source 18. The coarseness desired in the resulting sweep determines the magnitude of the changes in the current produced by source 18. This, in turn, determines the number of changes and the extent of the count which must be produced by counter 17. The degree of linearity desired determines the number of matching gates 21–l through 21–N. The extent of the count which must be produced by counter 20 is the maximum count of counter 17 plus the number of matching gates 21–l through 21–N. The repetition rate of source 15 is equal to the maximum count of counter 20 divided by the desired sweep time. The manner in which matching gates 21–l through 21–N are connected to counter 20 is determined by the number of gates and the repetition rate of source 15. As evident from FIG. 3, the intervals between outputs from these gates increase until the midrange of counter 20 is reached and then decrease until the full count is reached.

Figure 4:
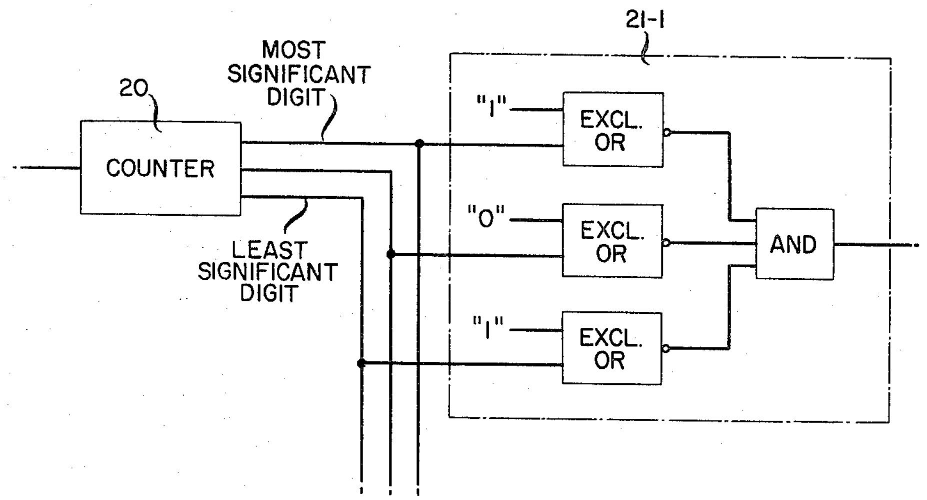
FIG. 4 is a block diagram of a matching circuit which may be used when practicing the invention.

Each matching gate 21–l through 21–N may, for example, comprise a plurality of exclusive OR gates connected to the output leads, respectively, of counter 20 and, furthermore, an AND gate connected to receive the exclusive OR gate outputs. Wired inputs connected to these exclusive OR gates determine the counter output to be recognized. A block diagram of this configuration for producing a "1" output for a counter output of "101" is shown in FIG. 4. Such configurations are readily appreciated by those skilled in the art.

The word recognizing circuitry need not comprise a plurality of matching gates but may, for example, comprise a single matching gate whose word recognizing character is changed each time the gate produces an output. This is readily accomplished when using a matching gate of the above-described type by connecting the otherwise wired inputs to a memory which is strobed by the matching gate output.

What is claimed is:

1. A sweep circuit for energizing a deflection coil of a cathode ray tube, said circuit comprising,
- a clock source,
- first and second counters,
- means connecting said first and second counters to said source to produce output combinations representative of the counts in said counters,
- means connected between said first and second counters and responsive only to predetermined output combinations from said second counter to make only said first counter nonresponsive to said clock source for the duration of each of said predetermined combinations, and
- a digitally controlled current source connected between said first counter and said coil and responsive to said first counter output combinations to produce a current in said coil.

2. A sweep circuit in accordance with claim 1 in which said means comprises
- a plurality of matching gates connected to said second counter to produce outputs on the occurrence of said predetermined output combinations, respectively.

3. A sweep circuit for energizing a deflection coil of a cathode ray tube, said circuit comprising
- a clock source,
- first and second counters,
- a normally enabled gate connected between said source and said first counter,
- means connecting said second counter to said source for receiving clock pulses from said source whenever said source produces such pulses,
- means connecting said second counter to said gate to disable said gate in response to predetermined output combinations from said second counter for the duration of each of said predetermined combinations, and
- a digitally controlled current source connected between said first counter and said coil.

4. A sweep circuit in accordance with claim 3 in which the last-mentioned means comprises
- a plurality of matching gates connected to said second counter to produce outputs on the occurrence of said predetermined output combinations, respectively, and
- an OR gate connected between said matching gates and said normally enabled gate to disable said normally enabled gate in response to outputs from said OR gate.

* * * * *

UNITED STATES PATENT OFFICE
CERTIFICATE OF CORRECTION

Patent No. 3,758,825 Dated September 11, 1973

Inventor(s) William John Kapes, Jr.

It is certified that error appears in the above-identified patent and that said Letters Patent are hereby corrected as shown below:

On the Title Page, instead of "William John Kapers, Jr." the inventor's name should read --William John Kapes, Jr.--. Column 2, line 63, "sponse" (first word) should read --spond--.

Signed and sealed this 25th day of December 1973.

(SEAL)
Attest:

EDWARD M.FLETCHER,JR.
Attesting Officer

RENE D. TEGTMEYER
Acting Commissioner of Patents